United States Patent Office 2,791,247
Patented May 7, 1957

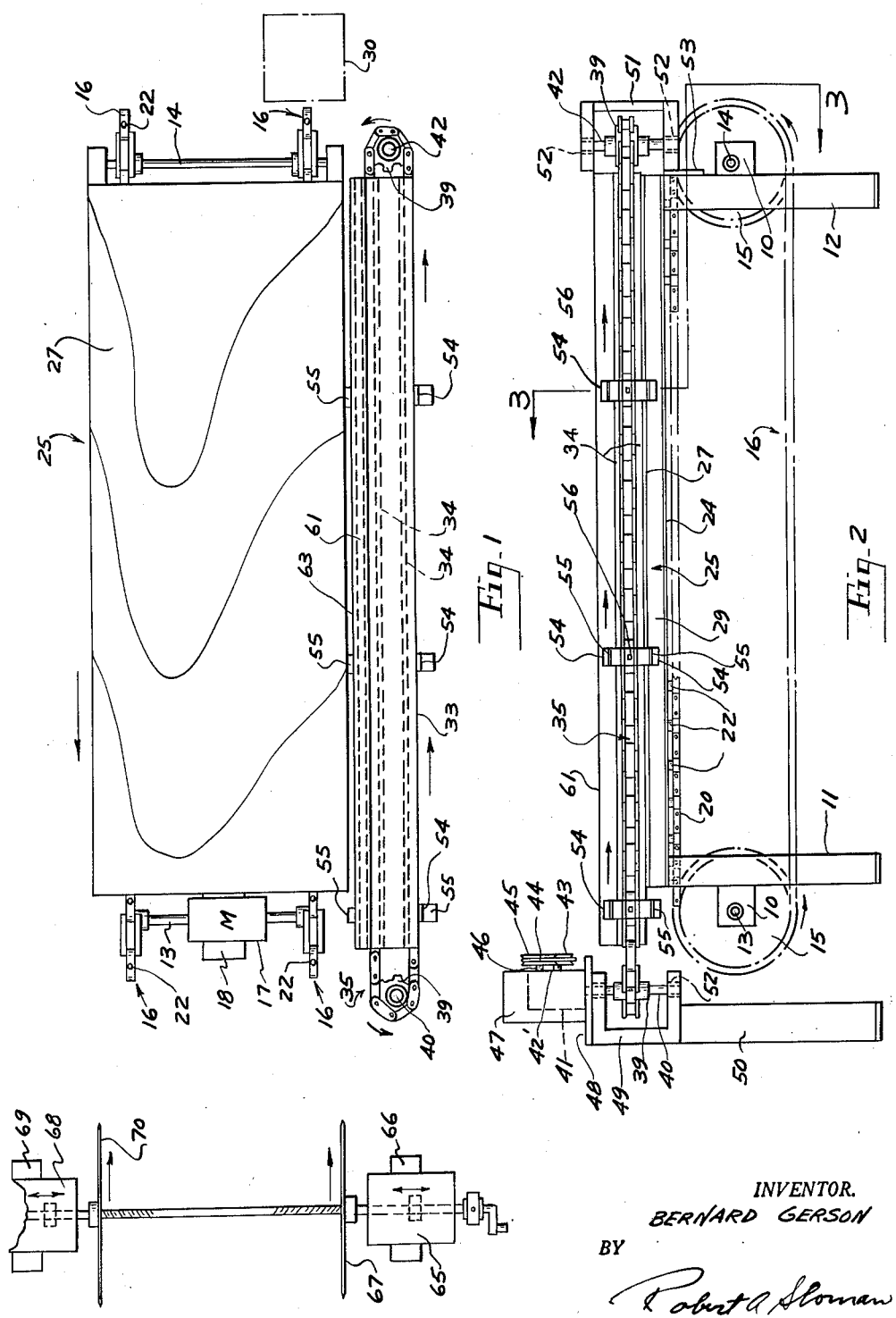

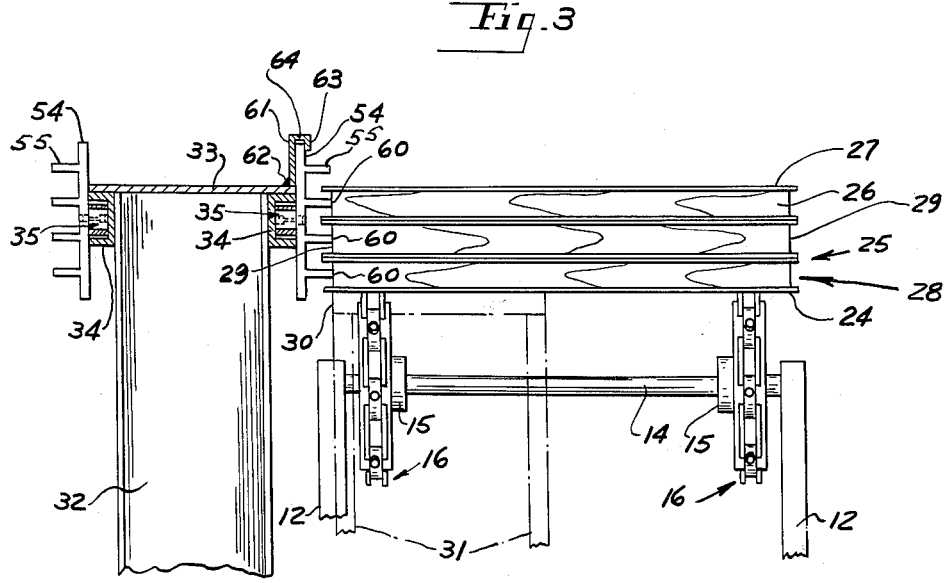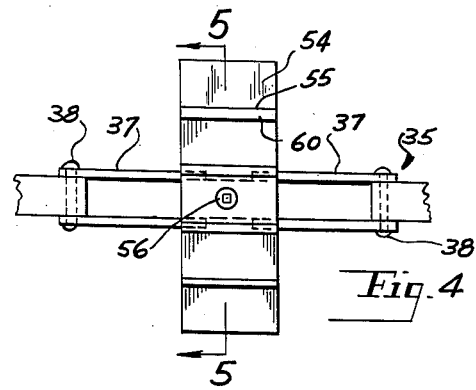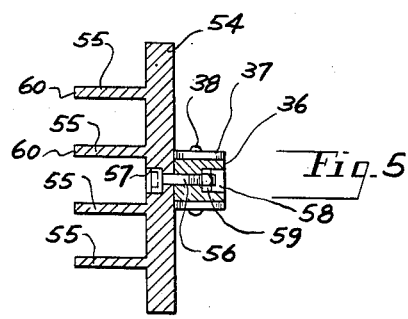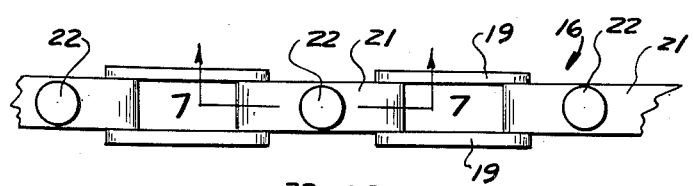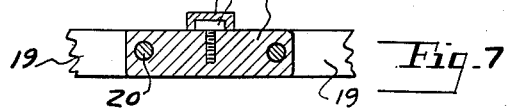

2,791,247

TRAVELING FENCE FOR TENONER

Bernard Gerson, Detroit, Mich.

Application February 2, 1956, Serial No. 563,024

8 Claims. (Cl. 143—49)

This invention relates to edge trimming saws and more particularly to an edge guide for a workpiece being trimmed by a tenoner.

Specifically, the present invention pertains to a travelling guide adapted for registry with a true portion of the longitudinal edge of a workpiece such as a door or stack of doors being moved longitudinally over the bed of a saw construction for the respective trimming of the opposite longitudinal edges thereof.

Heretofore, various means have been employed or attempted for achieving a perfectly true longitudinal cut or trim of the marginal edges. The difficulty has often existed that the guide means employed for the workpiece registered with a portion of the workpiece which was not perfectly true longitudinally, with the result that the resultant trimmed edges were not perfectly true or at right angles to the transverse axis of the workpiece.

This was particularly true in the longitudinal trimming of the marginal edges of doors and in the construction of hollow core type of doors. In the assembly of such doors an oversize sheet of plywood was glued upon the top and the bottom of a hollow frame with a suitable core interposed. The interassembly usually in the nature of a stack of such door constructions was mounted upon a tenoner construction for the purpose of trimming the opposite marginal edges, as well as the end edges.

The primary object of the present invention is to incorporate a guide means for the longitudinl movement of the stack of such doors for achieving true and correct trimming.

It is the further object of the present invention to provide a travelling fence or guide for a tenoner wherein the guide mechanism not only registers with a true portion of the workpiece to be trimmed but moves in unison therewith. Accordingly, there is no relative movement of the guide with respect to the object to be trimmed, with the result that more accurately true edges are attained.

These and other objects will be seen from the following specification and claims in conjunction with the appended drawings in which:

Fig. 1 is a plan view fragmentarily shown of the tenoner construction with a stack of doors mounted thereon for longitudinal trimming movement of the opposite marginal edges thereof.

Fig. 2 is a fragmentary elevational view thereof.

Fig. 3 is a fragmentary section taken on line 3—3 of Fig. 2.

Fig. 4 is a side elevational view of one of the guide elements forming a part of the present travelling fence as it is mounted upon its supporting conveyor.

Fig. 5 is a section taken on line 5—5 of Fig. 4.

Fig. 6 is a fragmentary plan view on an enlarged scale of one of the workpiece conveyor elements.

Fig. 7 is a fragmentary section on line 7—7 of Fig. 6.

It will be understood that the above drawings illustrate merely a preferred embodiment of the invention, and that other embodiments are contemplated within the scope of the claims hereafter set forth.

Referring to the drawings, there is fragmentarily illustrated an edge trimming type of saw or tenoner which includes pairs of spaced front and rear legs 11 and 12 forming a part of the frame 10 for the trimming device. Horizontally disposed, transversely arranged, parallel spaced shafts 13 and 14 are journaled between forward and rear portions of the said framework over which the workpiece supporting conveyors generally indicated at 16 extend in the manner hereafter described.

Suitable sprockets 15 are secured to each of the shafts 13 and 14 adjacent their outer ends over which extend in driven relation the pair of conveyor chains 16. As shown in Figs. 6 and 7, each of the sprocket chains 16 includes opposed pairs of links 19 pivotally connected at their respective opposite ends as by the pins 20 to the intermediate horiozntally disposed plates 21.

Some of these plates have mounted thereon suitable workpiece supporting rubber cushion elements 22 which include depending bolts 23 which project down into plates 21. These rubber cushions 22 are mounted upon the outer surfaces of the respective sprocket chains and provide suitable support means for the stack of doors 25 or other objects sought to be trimmed in the present tenoner construction. The rubber cushions provide an effective grip for securing the doors and for movably transporting the same longitudinally of the bed or body of the trimming machine into operative engagement with the opposed spaced saws 67 and 70, hereafter described.

Motor 17, Fig. 1, is mounted upon a suitable support 18, and is in driving relation with shaft 13 for operating the drive sprockets 15 for conveyor chains 16.

In the preferred embodiment of the present invention, the present guide mechanism, and for the tenoner construction, is employed for trimming a stack of pre-assembled hollow panel doors, such as indicated at 25 in Fig. 3. Each door assembly includes a hollow rectangular intermediate frame 26 consisting of opposed pairs of interconnected rails and stiles, whose opposite longitudinal edges as at 29 are perfectly true.

Each door assembly includes a bottom plywood panel 24 and a top plywood panel 27, which are centrally positioned over the said frame with the respective edges of the panels overlapping the said frame and suitably glued to the said frames to complete the door construction. Usually these doors are assembled in stacks and are cured or otherwise dried by suitable press over a predetermined period to thereby provide a rigid assembly as to each door.

The purpose of the trimming device is to bring the door construction down to a predetermined width and height. This normally necessitates a cut not only of the overlapping portions of the plywood panels, as indicated at 28, but also a longitudinal trim of a portion of the width of the door frame stile, or rail.

A suitable horizontally disposed platform 30 is provided at the right end of the trimming device and which includes supporting legs 31 shown in Fig. 3, over which the stack of doors 25 is horizontally slid onto the conveyors 16.

The present guide means for the longitudinal movement of the stack of doors is in the nature of a traveling fence construction which is mounted upon a plurality of suitable upright supports 32, Fig. 3, and which supports are arranged upon one side of the machine adjacent its longitudinal edge. Said supports include a horizontal top member 33 and directly below said top member and arranged upon opposite sides of the supports 32 are a pair of recumbent U-shaped outwardly projected conveyor guides 34 which extend substantially throughout the length of conveyor 16.

These guides 34 are adapted to receive the continuous sprocket chain 35, Fig. 4, which moves throughout a horizontal plane along the length of the said guides 34. Said chain includes a series of spaced blocks 36 which are joined to other such blocks by a series of opposed parallel spaced links 37 employing conventional type of pivot pins 38, as shown in Figs. 4 and 5.

Referring to Fig. 1, the sprocket chain 35 extends around a pair of longitudinally spaced, horizontally disposed sprockets 39 which are respectively secured to the upright shafts 40 and 42, shaft 40 being a drive shaft.

Both of the shafts 40 and 42 are supported and journaled within suitable bushings such as bushings 52, Fig. 2, within the supports 49 and 51 adjacent the opposite ends of the conveyor 16. Drive shaft 40 projects from the speed reducer 41 mounted on platform 48, in turn positioned upon the upright supports 50, one of which is shown in Fig. 2. The drive shaft 42' of said speed reducer has secured thereon pulley 43, which, through belt 44, receives power from drive pulley 45 on shaft 46 of motor 47, also mounted upon platform 48. Accordingly, there is provided suitable driving means for the continuous operation of the horizontally disposed conveyor 35 which forms a part of the present travelling fence construction. Plate 53 forms a part of the support means for the horizontal conveyor support 51, as shown in Fig. 2.

The present travelling fence includes a series of upright rectangularly shaped plates 54, which plates are always lying in an upright plane and are suitably secured to exterior portions of the horizontal conveyor 35, as by the bolts 56 whose heads are received within countersunk apertures 57 in the said plates, and whose shanks extend through corresponding apertures in blocks 36 forming a part of the conveyor 35. Nuts 59 nest within countersunk lateral apertures in blocks 36 to thereby complete the assembly between the series of upright parallel spaced plates 54 which form a portion of the present travelling fence construction. Accordingly, there is provided means for horizontal continuous movement of the said plates 54 in unison with the horizontal movements of conveyor 35.

Arranged upon one side of the plates 54 are a series of vertically spaced horizontally disposed guide fingers 55 whose outer upright edges 60 are perfectly true. These edges are adapted to operatively and guidingly engage the predetermined true longitudinal edges 29 of the respective door frames 26 of the stack of preassembled untrimmed doors 25, shown in Fig. 3.

Accordingly, as the said stack of doors 25 is movably mounted over and upon conveyor 16 for translation longitudinally of the bed of the saw, there will be a corresponding and simultaneous horizontal movement at the same speed of the horizontal conveyor 35 and the series of upright guides 54 which are at all times in contact with true marginal edge portions 29 of the said stack of doors to be trimmed.

In assembling the stack of doors from the platform 30 onto the trimming device, the handlers are careful to project one of the marginal edges of the said stack of doors to the left sufficiently that the respective marginal edges 29 of the frames 26 will cooperatively bear against the respective end edges 60 of the respective guide fingers 55. Accordingly, as the stack of doors is moved longitudinally by the conveyors 16 towards and past the saw blades 67 and 70 of Fig. 1, the marginal edges of the said frames are maintained in contact with a plurality of the guide fingers 55.

Upon one side of the platform 33 forming a portion of the guide means there is provided an elongated upright plate 61 suitably secured to platform 33 as by the weld 62. Said plate has a horizontally disposed elongated overhang portion 63 which, with plate 61, defines an intermediate horizontally disposed perfectly true guide channel 64 adapted to cooperatively and slidably receive the upper marginal edges of the respective plates 54 as they move longitudinally under the drive of the conveyor 35.

For the purpose of completing the trimming operation, there are arranged forwardly of one end of the bed of the tenoner a pair of saws 67 and 70 driven by the motors 65 and 68 mounted upon their respective supports 66 and 69.

Accordingly, as the stack of doors is fed longitudinally by the respective conveyors 16 and guided by the conveyor construction 35 and the series of guide fingers 54—55, the opposite marginal edges of the stack of doors, including the complete assembly for each door, is trimmed throughout its length. The present travelling guide fence assures that the direction of trim will be perfectly true with respect to the longitudinal axis of the doors, i. e., parallel to the central axis thereof. It is contemplated, of course, that the said saws 65 and 68 may be adjusted transversely to accommodate different widths of doors.

For this purpose also it is contemplated that the stack of doors could be arranged transversely upon the present horizontal conveyor 16 or an equivalent conveyor construction to thereby present simultaneously for trimming the edges of the said stack of doors for trimming simultaneously by the saws 67 and 70 or by an equivalent pair of such saws. Here also the said saws would naturally require such adjustment as would accommodate the saws to different heights of door constructions.

Having described my invention, reference should now be had to the claims which follow.

I claim:

1. In an edge trimmer including a pair of upright parallel spaced circular saws, a pair of parallel spaced longitudinally extending conveyors for supporting an object for movement towards said saws normally of their axes, a raised elongated support arranged on one side of said conveyors throughout their length, a continuous second conveyor slidably mounted on said support and movable in a horizontal plane in unison with said first conveyors, the inner flight of said second conveyor moving in a vertical plane parallel to the path of movement of said object, a series of longitudinally spaced upright plates mounted on said second conveyor throughout its length, and laterally directed guide means projecting from each plate, the guide means from a series of said plates simultaneously engaging and operatively retaining and guiding one edge of said object as it is conveyed towards and past said saws.

2. The edge trimmer of claim 1, said guide means including a series of vertically spaced fingers of uniform lateral extent.

3. The edge trimmer of claim 1, said guide means including a series of vertically spaced fingers of uniform lateral extent extending throughout the width of each plate in the direction of feed movement.

4. The edge trimmer of claim 1, said guide means including a series of vertically spaced fingers of uniform lateral extent and of rectangular shape, each finger having an elongated upright outer edge face.

5. The edge trimmer of claim 1, the mounting of said second conveyor consisting of a pair of outturned recumbent U-shaped guide channels upon the opposite outer longitudinal edges of said raised support, and an elongated downturned channel guide at the inner longitudinal edge of said raised support projecting thereabove guidably receiving the upper edges of said plates.

6. In an edge trimmer for a stack of assembled hollow panel door assemblies wherein the intermediate frame in each assembly has a longitudinally true edge face, a frame including a pair of upright parallel spaced circular saws, a pair of parallel spaced longitudinally extending horizontally coplanar continuous conveyors for supporting a stack of such door assemblies for movement in unison towards and past said saws normally of their axes, a raised elongated support arranged on one side of said conveyors throughout their length, a pair of coplanar outturned elongated recumbent U-shaped guide channels upon opposite sides of said raised support, a continuous second conveyor slidably mounted within said channels and movable in a horizontal plane in unison with said first conveyors, a series of longitudinally spaced upright plates mounted upon said second conveyor, and a plurality of vertically spaced laterally directed guide means of uniform lateral extent projecting from each plate, with each guide means adapted for operatively retaining and guiding engagement with a corresponding true edge face of a door frame in said stack as it is moved towards and past said saws.

7. The edge trimmer of claim 6, said guide means being of rectangular form, and having an elongated upright outer edge face.

8. The edge trimmer of claim 6, and an elongated downturned channel guide at the inner longitudinal edge of said raised support projecting thereabove, guidably receiving the upper edges of said plates.

References Cited in the file of this patent

UNITED STATES PATENTS

| | | |
|---|---|---|
| 345,758 | Barnes | July 20, 1886 |
| 2,490,085 | Nordquist et al. | Dec. 6, 1949 |